United States Patent
Nykyforov

(10) Patent No.: US 8,706,286 B2
(45) Date of Patent: Apr. 22, 2014

(54) METHOD AND SYSTEM FOR DETECTING SUITABILITY OF AN IMAGE TO EMBROIDERY

(75) Inventor: Vyacheslav Nykyforov, Littleton, MA (US)

(73) Assignee: Vistaprint Schweiz GmbH, Winterthur (CH)

(*) Notice: Subject to any disclaimer, the term of this patent is extended or adjusted under 35 U.S.C. 154(b) by 386 days.

(21) Appl. No.: 13/017,945

(22) Filed: Jan. 31, 2011

(65) Prior Publication Data

US 2012/0197429 A1    Aug. 2, 2012

(51) Int. Cl.
*D05C 5/02* (2006.01)

(52) U.S. Cl.
USPC .................. 700/138; 112/470.01; 112/475.19

(58) Field of Classification Search
USPC .................. 700/136–138; 112/102.5, 470.01, 112/470.06, 475.18, 475.19
See application file for complete search history.

(56) References Cited

U.S. PATENT DOCUMENTS

| | | | |
|---|---|---|---|
| 4,998,489 A * | 3/1991 | Hisatake et al. | 700/138 |
| 5,791,270 A * | 8/1998 | Mori | 112/102.5 |
| 5,803,000 A * | 9/1998 | Morita | 112/102.5 |
| 5,911,182 A * | 6/1999 | Uyama et al. | 112/102.5 |
| 6,397,120 B1 | 5/2002 | Goldman | |
| 6,600,966 B1 * | 7/2003 | Bailie | 700/138 |
| 6,804,573 B2 | 10/2004 | Goldman | |
| 6,836,695 B1 | 12/2004 | Goldman | |
| 6,947,808 B2 | 9/2005 | Goldman | |
| 7,016,756 B2 | 3/2006 | Goldman | |
| 7,016,757 B2 | 3/2006 | Goldman | |
| 7,587,256 B2 | 9/2009 | Goldman | |
| 2007/0118245 A1 | 5/2007 | Goldman et al. | |
| 2008/0079727 A1 | 4/2008 | Goldman et al. | |
| 2010/0017011 A1 | 1/2010 | Goldman et al. | |
| 2010/0191364 A1 | 7/2010 | Goldman | |
| 2011/0087728 A1 | 4/2011 | Goldman et al. | |

OTHER PUBLICATIONS

Gonzalez, et al., "Digital Image Processing," Second Edition, © Prentice-Hall, Inc., 2002, Chapter 3.7, pp. 125-137, and Chapter 6.7.3, pp. 335-339.

* cited by examiner

*Primary Examiner* — Nathan Durham
(74) *Attorney, Agent, or Firm* — Jessica Costa

(57) ABSTRACT

Methods and systems are presented for determining the suitability of an original image to embroidery based on analysis of the image and calculation of various metrics indicative of embroidery suitability.

27 Claims, 12 Drawing Sheets

METHOD AND SYSTEM FOR DETECTING SUITABILITY OF AN IMAGE TO EMBROIDERY

BACKGROUND OF THE INVENTION

The present invention relates generally to embroidery and more particularly to methods and systems for automated detection of suitability of an image to embroidery.

Embroidery is the art of applying decorative threaded designs to fabric or textiles. In machine embroidery, embroidery designs are stitched with an automated embroidery machine that holds a limited number of thread spools and stitches a design using a number of thread colors as limited by the number of thread spools. Embroidery designs are digitized into a sequence of embroidery primitives with embroidery software, and then converted to individual stitches using a stitch engine. Methods, systems, and techniques for computer-assisted embroidery are described in U.S. Pat. No. 6,836,695 to Goldman, U.S. Pat. No. 7,016,756 to Goldman, U.S. Pat. No. 6,947,808 to Goldman, U.S. Pat. No. 7,016,757 to Goldman, U.S. Pat. No. 7,587,256 to Goldman, U.S. Pat. No. 6,804,573 to Goldman, U.S. Pat. No. 6,397,120 to Goldman, U.S. Patent Application Publication No. US 2010-0191364 A1 to Goldman, U.S. Patent Application Publication No. US 2007-0118245 A1 to Goldman et al., U.S. Patent Application Publication No. US 2010-0017011 A1 to Goldman et al., U.S. Patent Application Publication No. US 2008-0079727 A1 to Goldman et al., and U.S. patent application Ser. No. 12/969,359 to Goldman et al., each of which is incorporated by reference herein for all that they teach.

Not all images are suitable for embroidery. Images best suited to embroidery are those containing only a few colors and which can be represented using simple shapes of solid color. Images with too many colors or which contain complicated or very small shapes do not translate well to embroidery. In the past, the judgment of whether or not an image lends itself well to embroidery has been left to humans with a trained eye for the types of images that will look good when translated into an embroidered image. However, it would be desirable to automate the image analysis process.

SUMMARY OF THE INVENTION

Methods and systems are presented for determining the suitability of an original image to embroidery based on analysis of the image and calculation of various metrics indicative of embroidery suitability.

In an embodiment, a method for determining the suitability of an original image to embroidery includes reducing the image to a predetermined number of colors to generate a reduced image, calculating a gradient match between the original image and the reduced image, calculating an irregularity metric indicative of a level of edge irregularities of the reduced image, and determining whether or not the original image is suited to embroidery based on at least the gradient match and the irregularity metric.

In another embodiment, non-transitory computer readable storage tangibly embodying program instructions instructing processor(s) to determine the suitability of an image to embroidery includes instructions for reducing the image to a predetermined number of colors to generate a reduced image, calculating a gradient match between the original image and the reduced image, calculating an irregularity metric indicative of a level of edge irregularities of the reduced image, and determining whether or not the original image is suited to embroidery based on the gradient match and the irregularity metric.

In yet another embodiment, an apparatus for determining the suitability of an original image to embroidery includes computer readable memory storing the original image, and one or more processors configured to reduce the image to a predetermined number of colors to generate a reduced image, calculate a gradient match between the original image and the reduced image, calculate an irregularity metric indicative of a level of edge irregularities of the reduced image, and determine whether or not the original image is suited to embroidery based on at least the gradient match and the irregularity metric.

In still another embodiment, a method for determining the suitability of an original image to embroidery includes one or more processors processing the original image to calculate one or more metrics indicative of embroidery suitability, performing an analysis of the one or more metrics to determine whether the image is suitable for embroidery, and indicating by the one or more processors whether the image is suitable for embroidery based on the analysis.

In still another embodiment, non-transitory computer readable storage tangibly embodying program instructions which, when executed by a computer, implement a method for determining the suitability of an original image to embroidery, including the steps of one or more processors processing the original image to calculate one or more metrics indicative of embroidery suitability, performing an analysis of the one or more metrics to determine whether the image is suitable for embroidery, and indicating by the one or more processors whether the image is suitable for embroidery based on the analysis.

In yet another embodiment, an apparatus for determining the suitability of an original image to embroidery includes computer readable memory storing the original image, and one or more processors configured to process the original image to calculate one or more metrics indicative of embroidery suitability, analyze the one or more metrics to determine whether the image is suitable for embroidery, and provide an indication as to whether the image is suitable for embroidery based on the analysis.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 4A shows an example of another original image;

FIG. 4B shows a color-reduced image corresponding to the original image of FIG. 4A;

FIG. 4C shows a gradient image corresponding to the original image of FIG. 4A;

FIG. 4D shows a gradient image corresponding to the color-reduced image of FIG. 4B;

DETAILED DESCRIPTION

Figure 1:
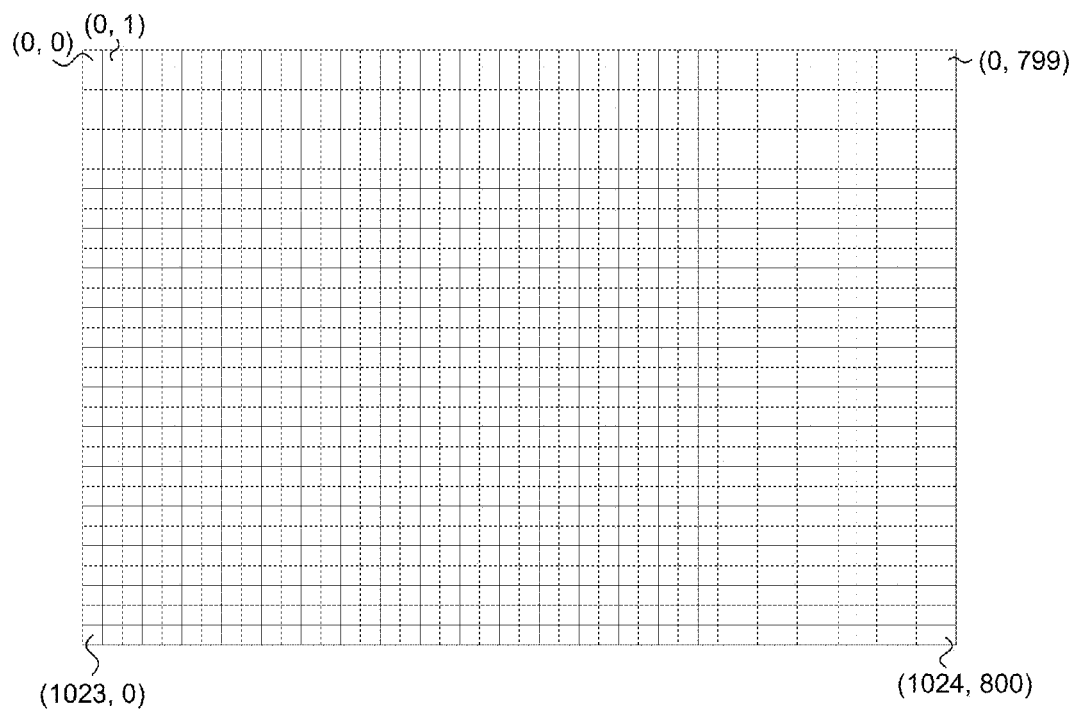
FIG. 1 is a pixel map of a digital image.

A digital image is composed of a 2-dimensional grid of pixels. For example, with reference to FIG. 1, a number of pixels is arranged in a rectangular grid. Each pixel is represented by its corresponding positional x- and y-coordinates in the grid. For example, a 1280×800 pixel image would be represented as 1280 rows and 800 columns, with pixel (0, 0) at the top left of the image, and pixel (1280, 800) at the bottom right of the image. The number of pixels in the image defines the resolution of the image, where high-resolution images have a higher density (and therefore number) of pixels than low-resolution images. The specification of each pixel depends on the type of image (grayscale vs. color, the type of color model used, and the number of gray levels/colors). For example, in a grayscale image, each pixel may be represented by a single brightness value ranging from 0 (no brightness—i.e., completely dark) to 255 (full brightness—i.e., completely light). In a color image, each pixel may be represented by multiple values. For example, in an RGB color model, the color of each pixel is defined by a corresponding Red value (ranging from 0-255), a corresponding Green value (ranging from 0-255), and a corresponding Blue value (ranging from 0-255).

An embroidery vendor, an embroidery machine operator, or an embroidery designer may wish to generate an embroidery design based on an image such as a photograph or graphic. In more advanced applications, it may be desirable to allow a customer to upload an image to be converted to an embroidery design and embroidered on a product. For example, a customer may wish to have their company logo or customized text or even a photograph converted to an embroidery design and embroidered on a textile product such as a shirt or hat.

When an image is to be converted to an embroidery design, it is desirable to determine whether or not the image is suitable for embroidery. Images which cannot be reasonably represented using a limited number of colors (corresponding, for example, to the number of colors the embroidery machine is capable of simultaneously stitching), or images which are too complex for embroidery (which would result in too many stitches or trims), are poor choices for embroidery.

As just mentioned, not all images are suitable for embroidery. Since embroidery machines typically allow only a limited number of thread colors (limited by the number of thread spools the machine holds), images having in excess of the maximum number of thread colors must be reduced to a number of colors equal to or less than the maximum number of thread colors. This process is known in the image processing art as "color reduction". During a color reduction process, all of the pixels in the image are classified and set to the nearest one of a reduced number of colors. If a given embroidery machine can embroider a design with up to 15 different colors (without having to change out threads), then a typical image having up to 16 million different colors (24 bits/pixel) will have to be reduced to an image having only 15 colors.

Figure 2A:
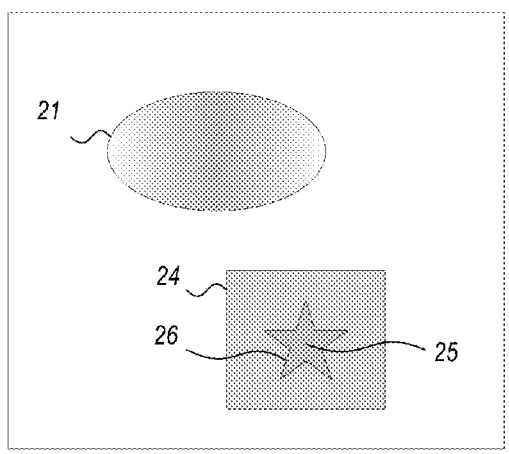
FIG. 2A is an example original image and FIG. 2B is a corresponding color-reduced image of the original image of FIG. 2A, illustrating introduction of new edges and disappearance of original edges resulting from color-reduction.
Figure 2B:
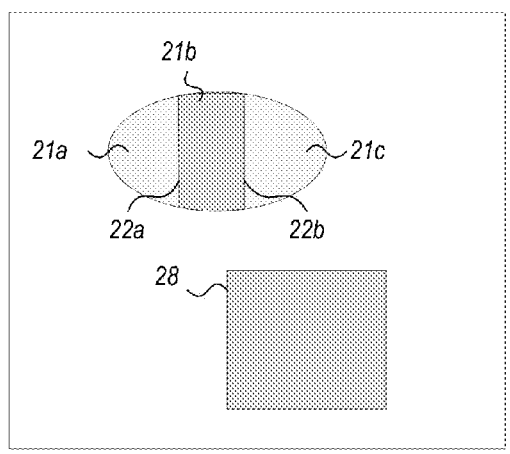

Color reduction can introduce new boundaries (edges) that were not visible in the original image. For example, referring to FIG. 2A, consider a region 21 of an image having a color that gradually changes across the region (e.g., from left to center and from center to right). Since the color transition is smooth and gradual, there are no visible edge features between the left, center, and right portions of the region 21. When color reduction is performed, however, as illustrated in FIG. 2B, the far left and far right portions 21a, 21c of the region 21 may be classified as a different color than the center portion 21b of the region. Pixels falling within the region 21 will be classified one way or another according to color range thresholds. Pixels at the far left 21a and far right 21c of the region 21 have a color value which falls within the range of a first color and are therefore classified as, and set to, the first color. Pixels closer to the center portion 21b of the region 21 have a color which falls within the range of a second color and are therefore classified as, and set to, the second color. The classification of all pixels in the region 21 into only two (or a small few) discrete colors therefore results in the fracturing of continuous color transitions into two or more discrete colored regions, introducing new edges 22a, 22b that were not present in the original image.

Color reduction can also result in the elimination of original boundaries. For example, referring again to FIG. 2A, an image may have one or more regions 24, 25 of different colors, separated by distinct boundaries 26. The different colors of the regions 24 and 25, however, may each fall within a color range which maps to the same single color for purposes of color reduction. In this case, as shown in FIG. 2B, the sub-regions 24 and 25 are reduced to a single mono-color region 28, eliminating the original boundary 26 (see FIG. 2A) dividing them. Depending on how significant the eliminated feature was, this may or may not be acceptable in the final appearance of the embroidered image.

Generally speaking, the introduction of new edges and/or the elimination of original edges resulting from the color reduction process reduces the match between the original and color-reduced image.

Figure 3A:
FIG. 3A shows an example original image.
Figure 3B:
FIG. 3B shows a color-reduced image corresponding to the original image of FIG. 3A.

FIGS. 3B and 4B illustrate example color-reduced images corresponding to respective original images shown in FIGS. 3A and 4A. The original image 30 shown in FIG. 3A reduces poorly since its corresponding color-reduced image 35 in FIG. 3B does not include some of the edges 31, 32 of the original image 30, and also adds edges 33, 34 not present in the original image 30.

Conversely, the original image shown in FIG. 4A reduces well since the corresponding color-reduced image shown in FIG. 4B does not eliminate any of the original edges nor does it add edges that were not present in the original image of FIG. 4A.

As illustrated by the above discussion and FIGS. 2A, 2B, 3A, 3B, 4A and 4B, the human eye is sensitive to image features such as edges. In image processing (by computers), image features are most easily extracted by computing the image gradient. The gradient between two pixels represents how quickly the color is changing and includes a magnitude component and a directional component. For a grayscale image of size M×N, each pixel at coordinate (x, y), where x ranges from [0 . . . M−1] and y ranges from 0 to N−1, defined by a function f(x, y), the gradient of f at coordinates (x, y) is defined as the two-dimensional column vector $$\nabla f = \begin{bmatrix} G_x \\ G_y \end{bmatrix} = \begin{bmatrix} \frac{\partial f}{\partial x} \\ \frac{\partial f}{\partial y} \end{bmatrix}.$$

The magnitude of the vector is defined as:

$$\nabla f = mag(\nabla f) = [G_x^2 + G_y^2]^{1/2} = \left[\left(\frac{\partial f}{\partial x}\right)^2 + \left(\frac{\partial f}{\partial y}\right)^2\right]^{1/2}.$$

For a color image of size M×N, each pixel at coordinate (x, y) is defined by a vector having a Red component value R(x, y), a Green component value G(x, y), and a Blue component value B(x, y). The pixel can be notated by a vector of color components as:

$$c(x, y) = \begin{bmatrix} R(x, y) \\ G(x, y) \\ B(x, y) \end{bmatrix}.$$

Defining r, g, and b as unit vectors along the R, G, and B axis of the RGB color space, we can define the vectors $$u = \frac{\partial R}{\partial x}r + \frac{\partial G}{\partial x}g + \frac{\partial B}{\partial x}b$$

and $$v = \frac{\partial R}{\partial y}r + \frac{\partial G}{\partial y}g + \frac{\partial B}{\partial y}b$$

and then define the terms $g_{xx}$, $g_{yy}$, and $g_{xy}$ in terms of the dot product of these vectors, as follows:

$$g_{xx} = u \cdot u = \left|\frac{\partial R}{\partial x}\right|^2 + \left|\frac{\partial G}{\partial x}\right|^2 + \left|\frac{\partial B}{\partial x}\right|^2$$

$$g_{yy} = v \cdot v = \left|\frac{\partial R}{\partial y}\right|^2 + \left|\frac{\partial G}{\partial y}\right|^2 + \left|\frac{\partial B}{\partial y}\right|^2$$

$$g_{xy} = u \cdot v = \frac{\partial R}{\partial x}\frac{\partial R}{\partial y} + \frac{\partial G}{\partial x}\frac{\partial G}{\partial y} + \frac{\partial B}{\partial x}\frac{\partial B}{\partial y}$$

The direction of the gradient of the vector C at any point (x, y), is given by:

$$\theta = \frac{1}{2}\tan^{-1}\left[\frac{2g_{xy}}{g_{xx} - g_{yy}}\right]$$

and the magnitude of the rate of change at (x,y), in the direction of θ, is given by:

$$F(\theta) = \left\{\frac{1}{2}[(g_{xx} + g_{yy}) + (g_{xx} - g_{yy})\cos 2\theta + 2g_{xy}\sin 2\theta]\right\}^{\frac{1}{2}}.$$

Figure 3C:
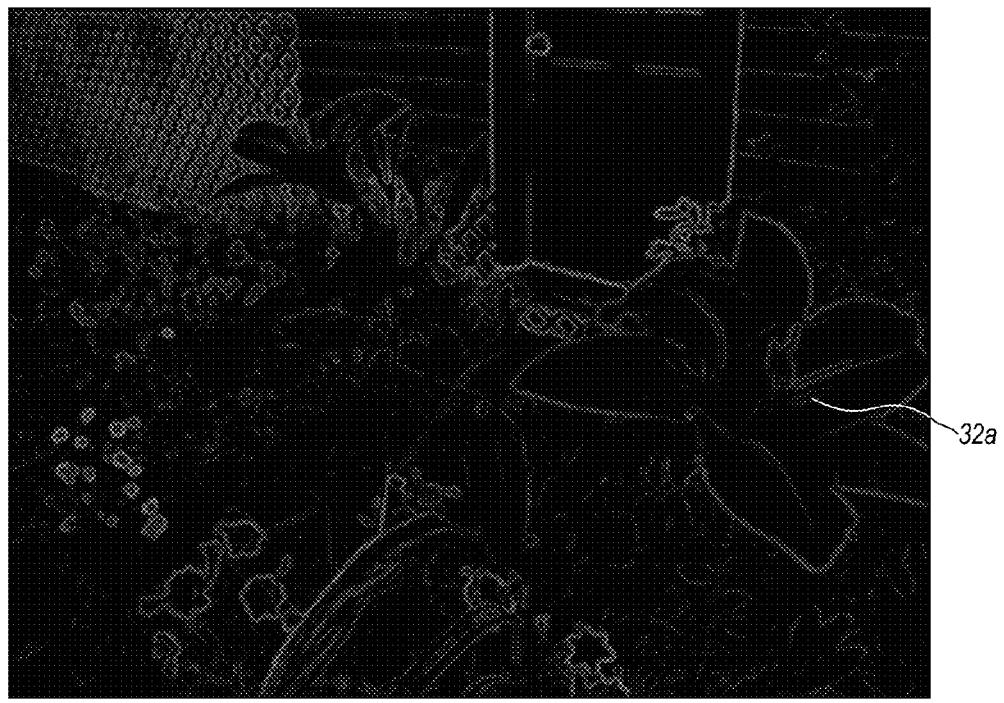
FIG. 3C shows a gradient image corresponding to the original image of FIG. 3A.
Figure 3D:
FIG. 3D shows a gradient image corresponding to the color-reduced image of FIG. 3B.

FIG. 3C depicts the gradient image corresponding to the original image in FIG. 3A, and FIG. 3D depicts the gradient image corresponding to the color-reduced image in FIG. 3B. As illustrated, (1) pixels in regions of constant color value map to a zero value in the gradient image (and hence the corresponding gradient pixel is completely dark), (2) pixels corresponding to the onset of a color value step (i.e., an edge) or ramp map to non-zero values in the gradient image, and (3) pixels corresponding to areas of color transition (i.e., more gradual color change) map to proportional non-zero values in the gradient image.

The addition or elimination of edges in a color-reduced image can be detected by comparing the positions of the edges in the original image and comparing them to the positions of the edges in the color-reduced image. The more differences there are between the gradient images, the lower the gradient match, and the lower the suitability of the image to embroidery. Since not all additions or eliminations of edges are necessarily catastrophic to the aesthetics of an embroidered image, an adjustable gradient match threshold can be introduced to the automated detection to allow adjustment of the sensitivity of the embroidery suitability measure to the gradient match level. When a gradient match threshold is used, an image passes embroidery suitability with respect to the gradient match metric when the gradient match is above the gradient match threshold and fails the embroidery suitability test when the gradient match is below the gradient match threshold. For example, if there is a 95% match between the gradient image of the original image and the gradient image of the color-reduced image, and the threshold is set to 90%, then the image passes the gradient match prong of the embroidery suitability test. If, however, the gradient match threshold is set to 98%, then the image would fail the gradient match prong of the embroidery suitability test.

In addition to determining the ability of the image to be reasonably represented using a limited number of colors, the embroidery suitability test may also include the evaluation of shapes and sizes of the colored regions. As mentioned above, designs are most suited for embroidery when the design can be represented using a few larger mono-color regions with regular edges. As used herein, the term "irregular" refers to rapid directional changes within a small area. An irregular edge for the purposes of this embroidery discussion is an edge demarcating the boundary between two colors whose directional component of the gradient is widely variant across multiple pixels in the same small area. Generally, this condition indicates that the edge changes direction multiple times within a small area (e.g., a few pixels) or there are multiple edges within the same small area that diverge directionally. These types of conditions are symptomatic of high detail—that is, too much detail not easily be represented with embroidery stitches. Examples of irregular edges are fine jagged edges or complicated detail.

Figure 3E:
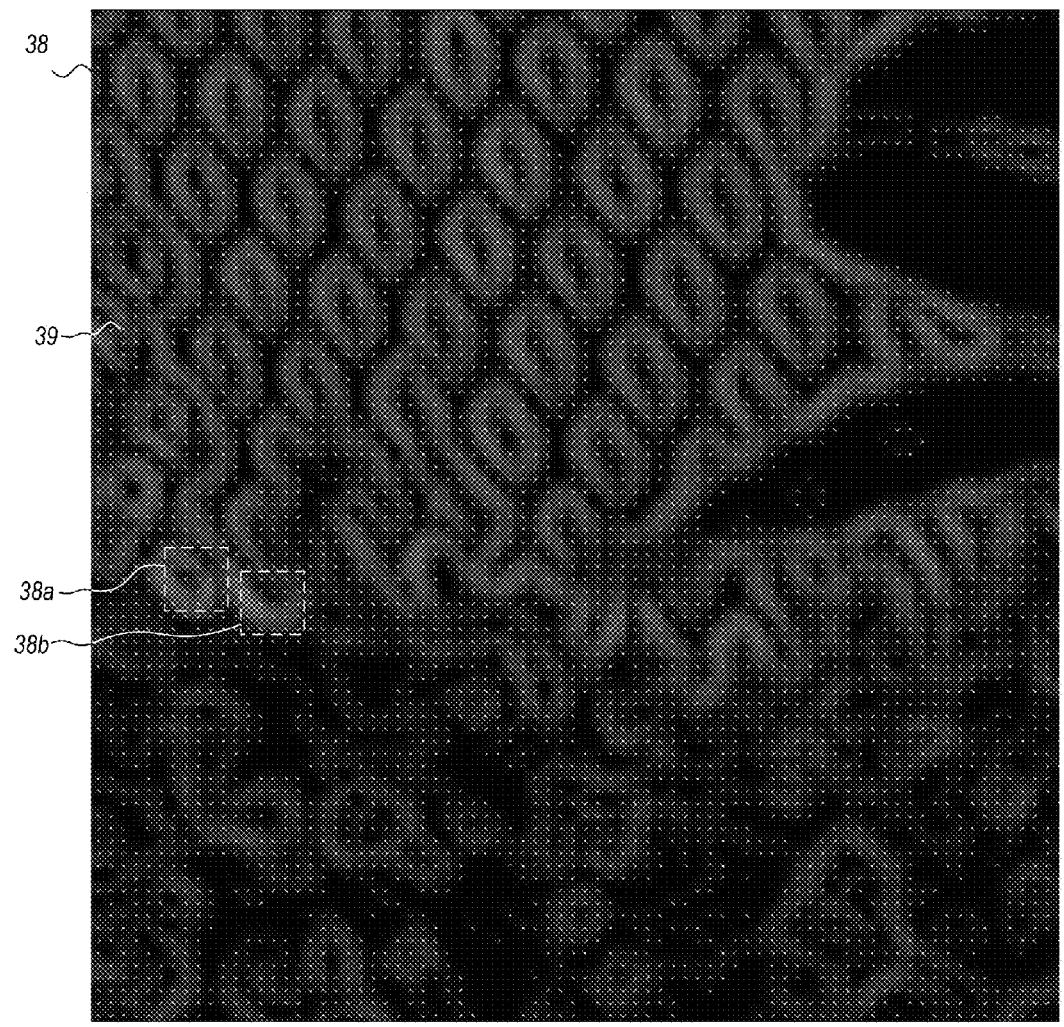
FIG. 3E shows a map of the directional component of a portion of the gradient of FIG. 3D.
Figure 3F:
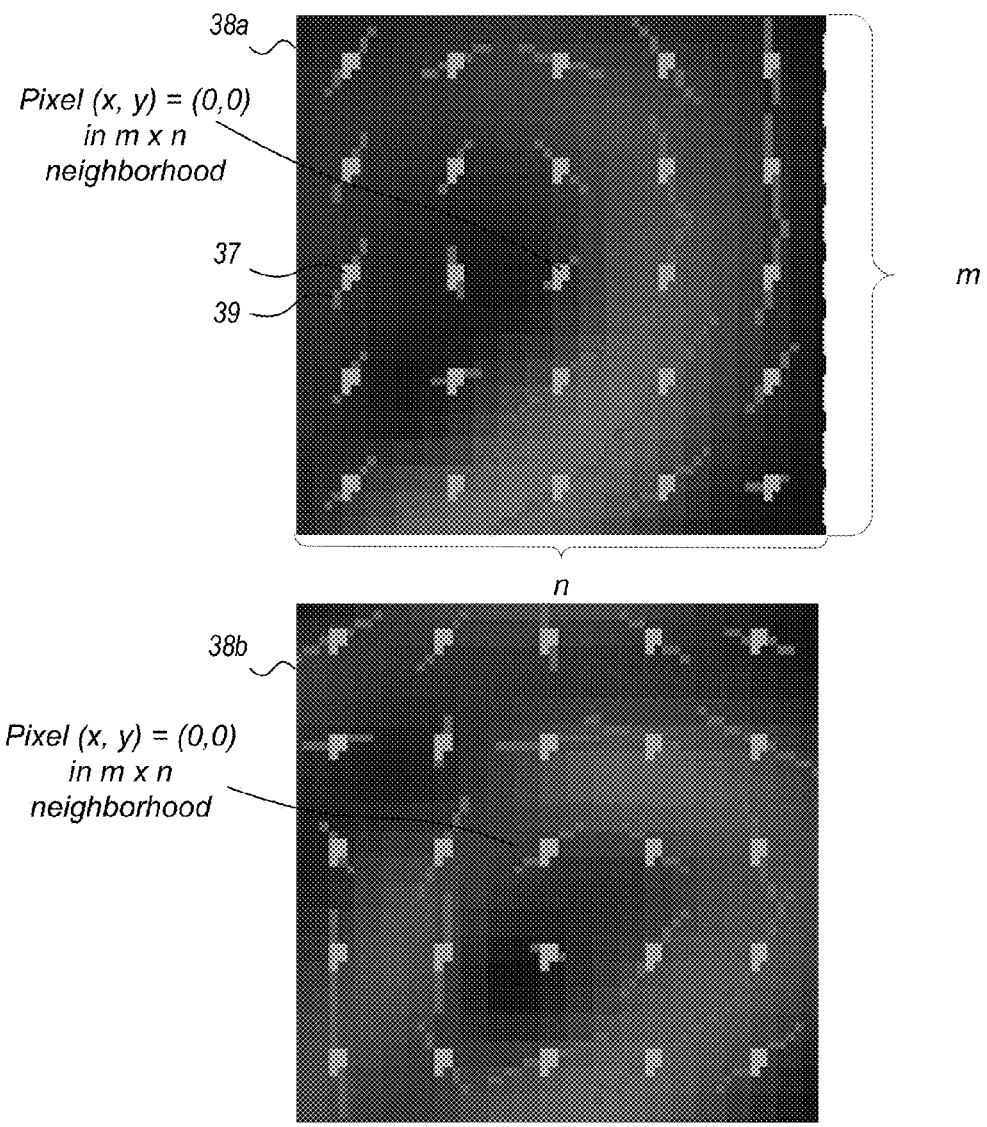
FIG. 3F shows zoomed-in areas of the map in FIG. 3E.
Figure 4G:
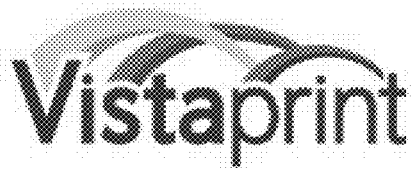
FIG. 4G is a histogram illustrating the pixel irregularity distribution corresponding to the image of FIG. 4A.
Figure 4G:
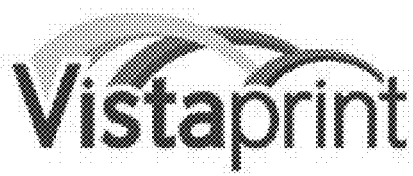
Figure 4G:
Figure 4G:
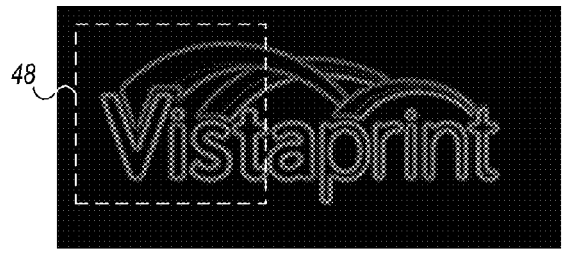
Figure 4G:
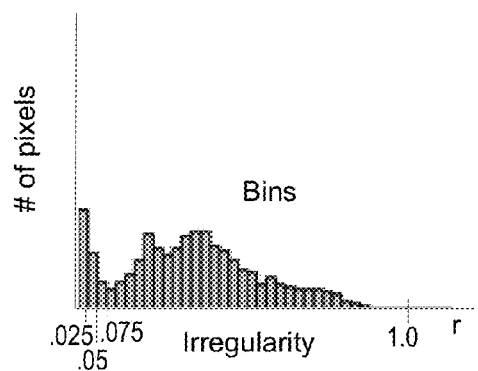
Figure 4E:
FIG. 4E shows a map of the directional component of a portion of the gradient of FIG. 4D.
Figure 4F:
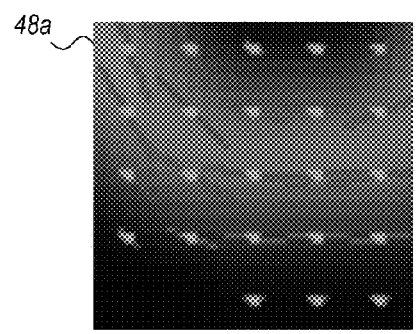
FIG. 4F shows a zoomed-in area of the map in FIG. 4E.

To illustrate this point, FIG. 3E is a zoomed-in view of a map of the directional component of a section 38 of the reduced color gradient image of FIG. 3D. The zoomed-in section 38 corresponds to the contents of the reduced color gradient image marked by the dotted line at 38 in FIG. 3D. Referring again to FIG. 3E, in this map, a small line 39 represents the directional component of its corresponding pixel. Each small line 39 runs orthogonal to the actual directional component of its corresponding pixel. Areas 38*a* and 38*b* are shown in zoomed-in detail in FIG. 3F. As illustrated in FIG. 3F, areas 38*a* and 38*b* each corresponding to a 5×5 grid of pixels 37. Both areas 38*a* and 38*b* illustrate wide variance in the directional component of the gradient of the pixels, indicating high irregularity in these areas 38*a*, 38*b*. In contrast, FIGS. 4E and 4F, showing a zoomed-in view of a map of the directional component of a section 48 of the reduced color gradient image of FIG. 4D and zoomed-in detail of a 5×5 pixel window 48*a* from the section 48 in FIG. 4F, respectively, illustrate an edge characterized by high regularity because all directional transitions are gradual.

A useful measure for edge irregularity is the absolute value of the cross-product of the directional component of the gradient vector of neighboring pixels. The cross-product between vectors is proportional to the level of divergence (i.e., angular difference). One linear method for obtaining an indication of the level of edge irregularity in an image is to find the average irregularity of each pixel (as taken over a predefined window of neighboring pixels and taking into account only those pixels having a minimal degree of gradient activity (i.e., above a predefined minimum gradient magnitude threshold)). The average can then be taken of the pixels exhibiting some degree of irregularity (preferably above some predefined minimal irregularity threshold) to obtain the overall measure of irregularities contained in the image. For example, referring to FIG. 3F, consider each area 38*a*, 38*b* to be a window of neighboring pixels, the center pixel being defined as p(x, y), the top left pixel as p(x−2, y−2), the top right pixel as p(x+2, y−2), the lower left pixel as p(x−2, y+2), the lower right pixel as p(x+2, y+2). If we define the Norm of the irregularity in the pixel neighborhood as:

$$N(x, y) = \sum_{\substack{-m \leq i \leq m \\ -n \leq j \leq n}} \frac{1}{DIST(P(x, y), P(i, j))}$$

where DIST is a distance function which represents the distance between two pixels, P(x, y), P(i,j). Then the average pixel irregularity of a pixel (x, y) centered in an m×n pixel neighborhood may be calculated as:

$$P_{AVG\_IRR}(x, y) = \frac{\sum_{\substack{-m \leq i \leq m \\ -n \leq j \leq n}} P_{DIR}(x, y) \times P_{DIR}(i, j)}{N(x, y)}$$

where $P_{DIR}(x,y)$ is the directional component of the gradient at pixel (x, y), $P_{DIR}(i, j)$ is the directional component of the gradient at pixel (i, j), x represents the cross-product of the directional vectors, and pixels are only counted in the numerator sum if the gradient activity in both P(x, y) and P(i, j) are above the minimum gradient threshold $G\_MAG_{MIN}$. The Norm, N(x, y), is calculated over all pixels in the m×n neighborhood, regardless of whether there is gradient activity or not, and assures that the $P_{AVG\_IRR}(x, y)$ is always in the range from [0 . . . 1].

Note that in this embodiment, the use of the inverse of the distance between pixels operates as a weighting, giving more weight to the cross-products of pixels of closer distance. This is a more accurate model, but it will be appreciated that a reasonable irregularity measure could be generated without including the weighting functionality (i.e., by taking the raw average of the cross products of the pixel of interest with each other pixel in the neighborhood).

Note also that in this embodiment, the use of a minimal gradient activity threshold, $G\_MAG_{MIN}$, discounts the contribution of pixels where there is no or little gradient activity—that is, non-edge pixels do not contribute to the calculation. This is a more accurate way of measuring the irregularity since non-contributing pixels could improperly skew the irregularity measure to be smaller than it actually is. However, certainly there is at least some indication of the degree of irregularity at a given pixel even without discounting the pixels with little or no gradient activity.

The overall image irregularity metric can be obtained by averaging the irregularity values of all pixels having gradient activity meeting at least a minimal threshold $G\_MAG_{MIN}$. That is, for an r×s image:

$$IMAGE_{IRR} = \frac{\sum_{\substack{0 \leq i \leq r-1 \\ 0 \leq j \leq s-1}} P_{AVG\_IRR}(i, j)}{Irregular\_Pixel\_Count}$$

where $P_{AVG\_IRR}(i,j)$ is the average irregularity as computed in the above equation and preferably includes only those pixels which meet at least a minimal gradient threshold, $G\_MAG_{MIN}$. Irregular_Pixel_Count refers to the actual number of pixels summed in the numerator, and therefore preferably includes only those pixels that exhibit at least a minimal gradient activity $G\_MAG_{MIN}$.

The calculation of the image irregularity according to the embodiment just described results in a linear representation of the irregularity of the image and represents the average of the gradient activity on all pixels exhibiting gradient activity. This may be fine for the particular application.

Figure 3G:
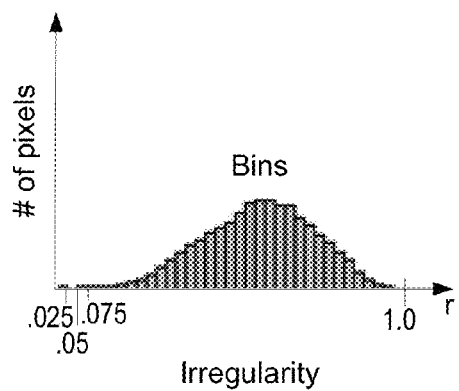
FIG. 3G is a histogram illustrating the pixel irregularity distribution corresponding to the image of FIG. 3A.

An alternative embodiment can be implemented to give more weight to pixels exhibiting higher gradient activity. FIGS. 3G and 4G show a histogram plotting the number of occurrences of pixels falling within each of a predetermined range of pixel irregularity. That is, if the irregularity measure is normalized to fall within a range of 0 (no irregularity) and 1 (highest possible irregularity), and the full range between 0 and 1 is discretized into n number of sub-ranges (or "bins"), then the histogram will show the distribution of the number of pixels with respect to irregularity. This distribution can be utilized to calculate a nonlinear irregularity metric which may be used in place of, or in addition to, the linear irregularity metric discussed above.

Referring to FIGS. 3G and 4G, the total irregularity range from 0 to 1 is divided into 40 bins, each having a 0.025 range. The number of pixels having an average irregularity between 0 and 0.025 are plotted vertically in the first bar, the number of pixels having an average irregularity between 0.025 and 0.050 are plotted vertically in the second bar, and so on. Images characterized by highly irregular edges result in a histogram having a higher density at the right of the histogram, and images characterized by smooth regular edges result in a histogram with concentrated activity closer to the left of the histogram. FIG. 3G displays a high concentration of pixels with mid- or high-irregularity. In contrast, FIG. 4G reveals that most of the pixel irregularity falls within the lower irregularity values, indicating that the image in FIG. 4A is much more suited for embroidery than the image shown in FIG. 3A.

To calculate a numeric metric, the following equation can be used:

$$IMAGE_{IRR\_nonlinear} = \frac{\sum_{i=0}^{B-1} r_i^2 * N_i}{\sum_{i=0}^{B-1} N_i}$$

where B represents the number of bins in the normalized irregularity range, i represents a particular bin, r represents the distance from 0 to the midpoint of the bin range (for example, r=0.0125 for bin 0 where bin 0 ranges from 0 to 0.025; r=0.0375 for bin 1 where bin 1 ranges from 0.025 to 0.050, and so on), and $N_i$ represents the number of pixels in bin i. As noted from this equation, because the distance r increases with increasing irregularity, pixels having high irregularity are weighted higher the greater the irregularity of the pixel. Furthermore, since the distance r is squared in the equation, the weights non-linearly increase as the irregularity increases.

In this way, the non-linear irregularity measure gives an even more accurate indicator of the overall irregularity of an image in the context of determining whether an image is suitable to embroidery by focusing the measurement on high numbers of pixels having high-value irregularities.

In an image containing mainly large regular shapes, the irregularity measure will be low, whereas images containing a lot of detail will result in a high irregularities value.

In addition to generating metrics representing the suitability of an image with respect to color reduction and edge irregularity, it may also be desirable to estimate the number of stitches required to stitch the image. Each stitch takes time to stitch in production, and designs with an excessive amount of stitches may take more time than desired for embroidery production. Understanding the number of stitches estimated to stitch a design allows one to reject images that will take too long to embroider.

Figure 5:
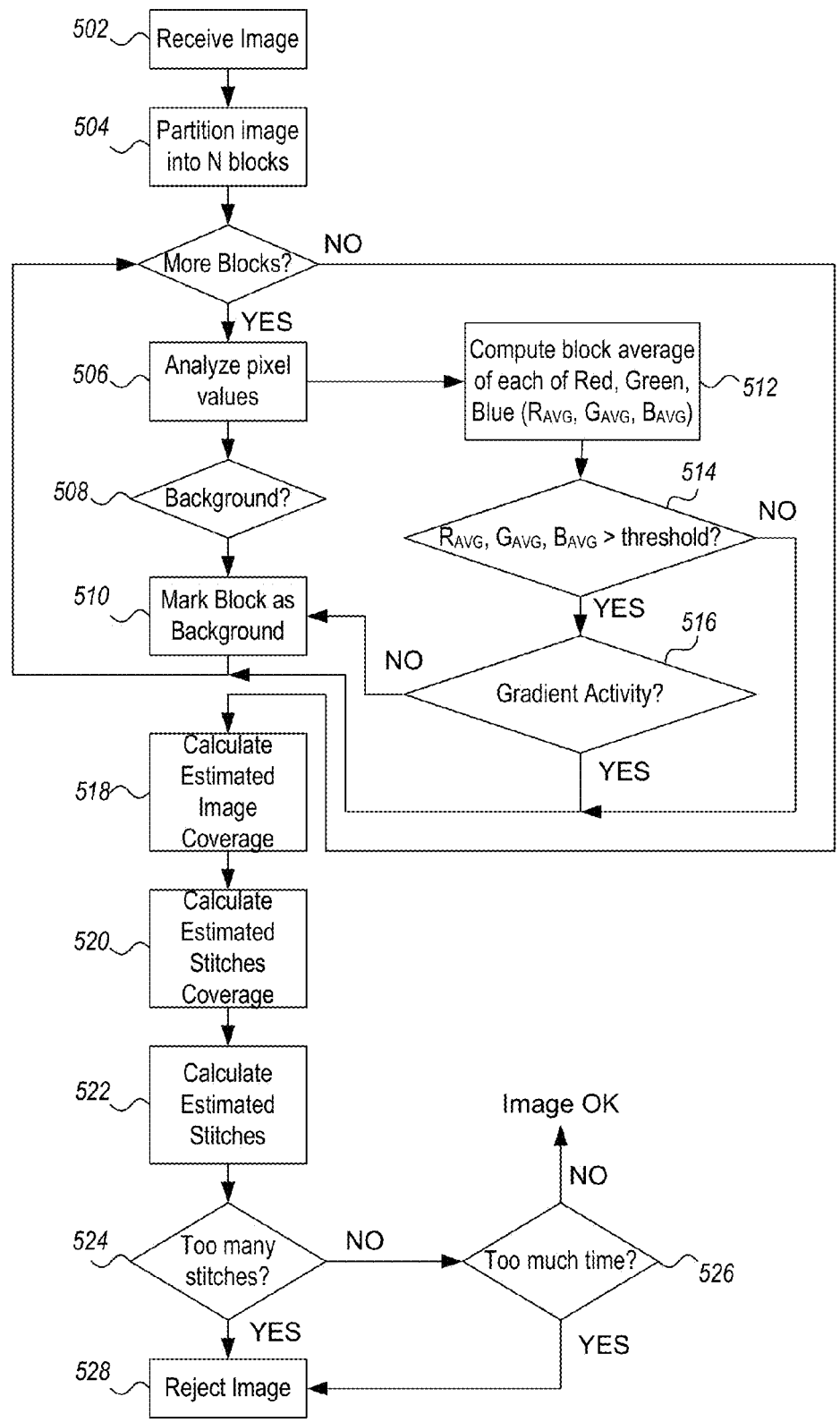
FIG. 5 is a flowchart illustrating an exemplary method for calculating an estimated stitch count metric.

FIG. 5 is a flowchart illustrating an exemplary method for estimating the number of stitches and/or time required to stitch the image. As illustrated, the image is received (step 502) and partitioned into a set of N blocks (step 504). The pixels in each block are analyzed (step 506) to determine whether the block contains only background pixels (e.g., white). If so (step 508), the block is marked as "background" (step 510). In one embodiment, values of the average Red, Green, and Blue component color values $R_{AVG}$, $G_{AVG}$, and $B_{AVG}$, (averaged over the entire block) are obtained. If each of $R_{AVG}$, $G_{AVG}$, and $B_{AVG}$ are above a predetermined threshold (which is close to the "white" value) (step 512) and the gradient activity is small or zero (step 514), then the block is marked as "background".

Blocks marked as background will not be stitched and can thus be removed from the embroidery design. The ratio of the number of blocks containing stitches over the total number of blocks N can then be calculated (step 516) to obtain the estimated image coverage for the image—namely:

$$Coverage_{Est} = \frac{N-B}{N}$$

where N is the total number of blocks and B is the number of background blocks.

Given the estimated image coverage and the size, $T_{size}$, of the targeted embroidery area, the amount of coverage of the embroidered design on the targeted embroidery area on the textile can then be calculated (step 518) by multiplying the estimated embroidery stitch coverage for the image by the size of the targeted embroidery area—that is:

$$StitchCoverage_{Est} = Coverage_{Est} * T_{size}.$$

For example, suppose the estimated image coverage $Coverage_{Est}$ of an image corresponds to 90% image coverage after the background blocks are determined, and the targeted embroidery area $T_{size}$ is a 10 square inch area. The estimated stitch coverage $StitchCoverage_{Est}$ is thus 90% of 10 square inches, or 9 square inches.

Given the estimated stitch coverage $StitchCoverage_{Est}$, the estimated number of stitches $Stitches_{Est}$ required to embroider a design converted from the image can be calculated (step 520) as:

$$Stitches_{Est} = StitchCoverage_{Est} * N_{stitches\_per\_sqi}$$

where $N_{stitches\_per\_sqi}$ is the number of stitches the embroidery machine stitches per square inch on average. For example, suppose in the above example that the embroidery machine stitches 1500 stitches per square inch on average. The estimated number of stitches required to embroider a design based on the image is therefore 9 square inches*1500 stitches per square inch, or 13,500 stitches.

The estimated number of stitches $Stitches_{Est}$ can then be compared to a threshold (step 522) to determine (step 524) whether the estimated number of stitches $Stitches_{Est}$ is too great. Alternatively, or in addition, the time $Time_{Est}$ required to stitch the estimated number of stitches $Stitches_{Est}$ can be calculated (step 526) (for example, by multiplying the estimated stitches $Stitches_{Est}$ by the average time per stitch), and the calculated time $Time_{Est}$ can be compared to a maximum allowed time threshold $TIME_{MAX}$ to determine whether the image will take too much time to embroider. If either of the estimated number of stitches $Stitches_{Est}$ or calculated time $Time_{Est}$ fails to meet the number of stitches or time requirements for production, the image can be rejected (step 528).

Figure 6A:
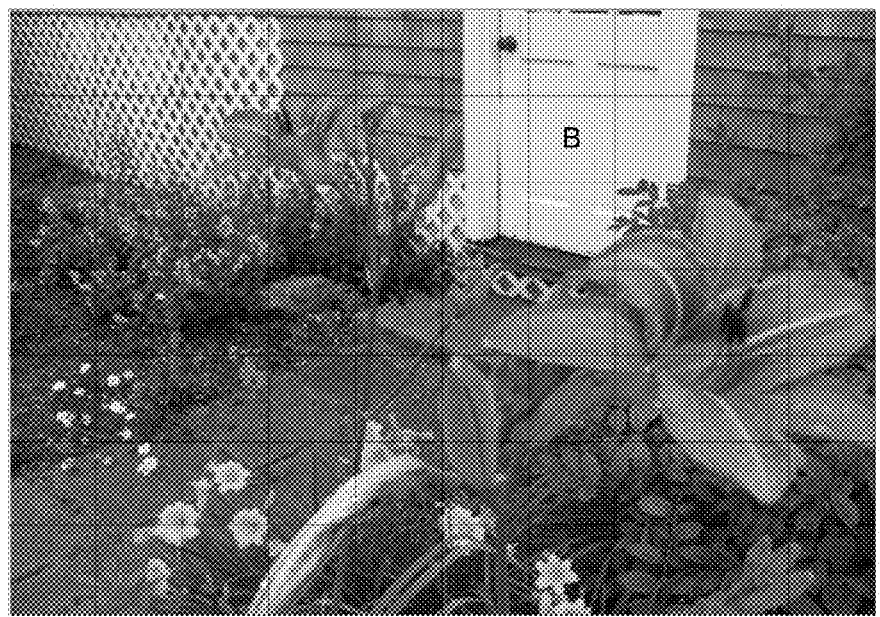
FIG. 6A is a diagram illustrating the original image of FIG. 3A partitioned into blocks and indicating the block classified as background.
Figure 6B:
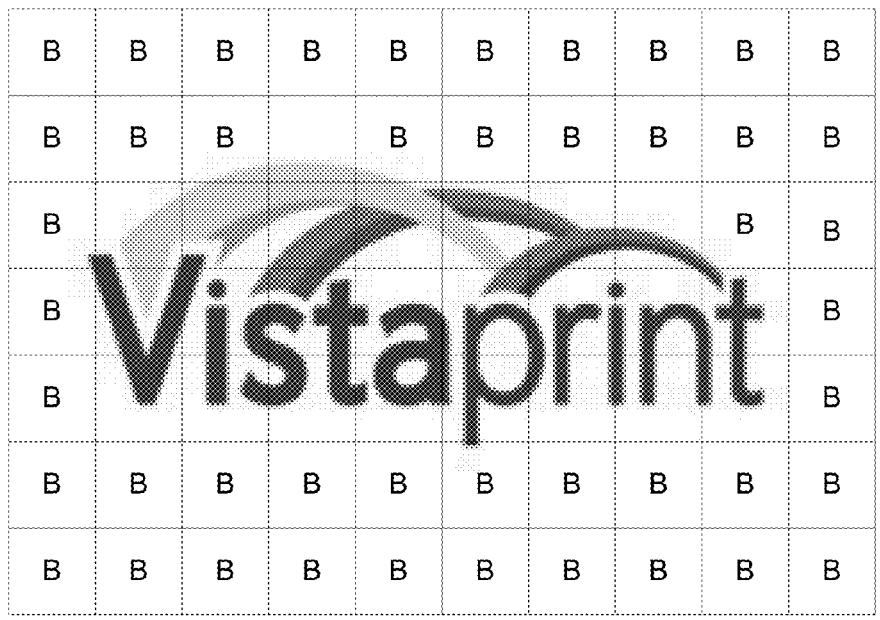
FIG. 6B is a diagram illustrating the original image of FIG. 4A partitioned into blocks and indicating the blocks classified as background.

For example, FIG. 6A shows the image of FIG. 3A partitioned into 70 blocks, and FIG. 6B shows the image of FIG. 4A partitioned into 70 blocks. Blocks classified as background are marked with a "B". As illustrated, the image in FIG. 6A is considered nearly all foreground, having only a single block classified (incorrectly) as background. (Note the single block marked as "background" is not actually background, but is part of the white door, and thus under the algorithm of FIG. 5, is classified as background—this is known as a "false positive"). Since this is merely an estimate, in some systems, a few false positives may be considered tolerable. In contrast, the image in FIG. 5B has 46 out of 70 blocks classified as background, and thus will require far fewer stitches than the image in FIG. 6A.

Figure 7:
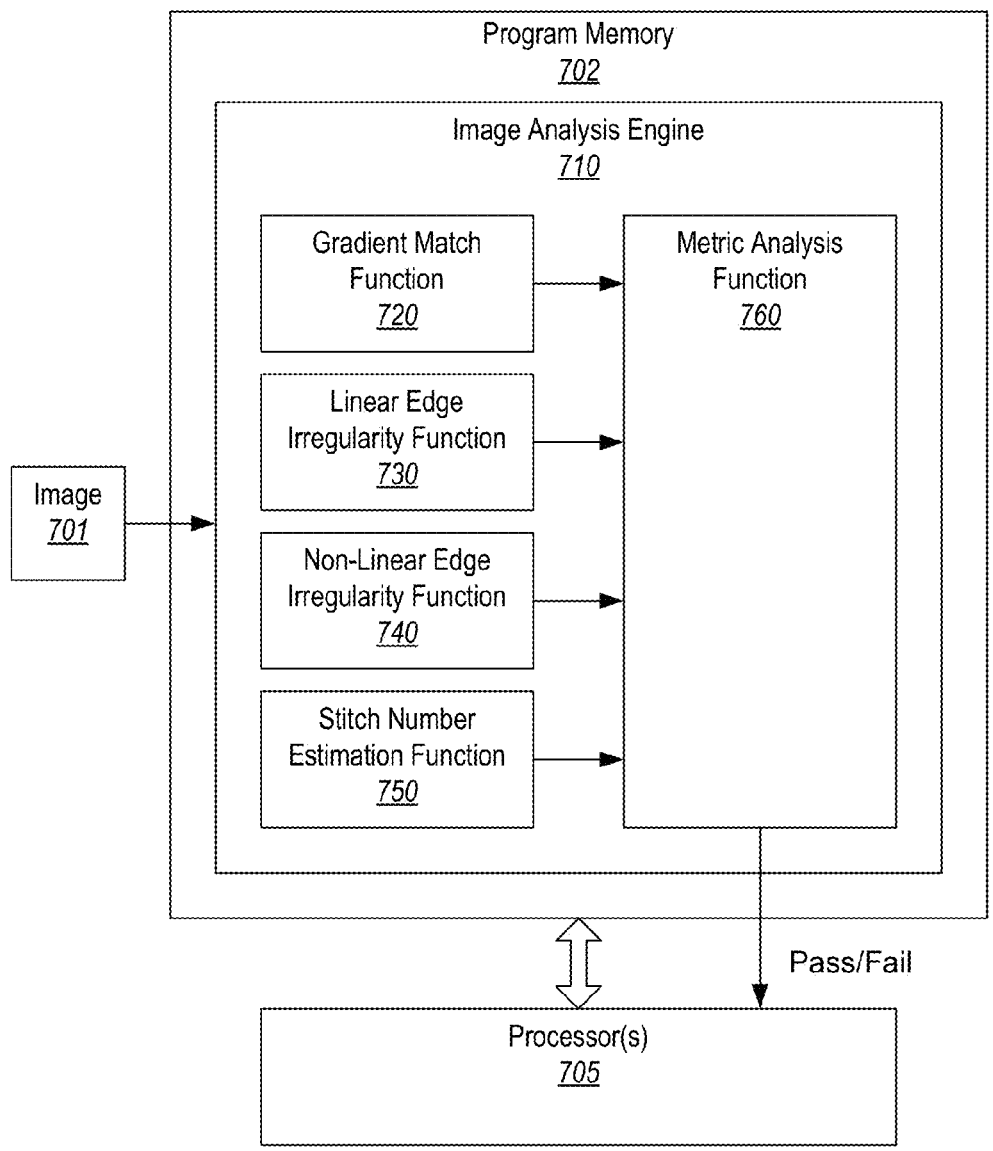
FIG. 7 is an exemplary embodiment of an embroidery suitability detection system.

FIG. 7 is a block diagram depicting an exemplary system 700 for automatically detecting the suitability of an image for embroidery using image metrics such as those described above and the techniques for obtaining the measurements corresponding to each metric. As depicted therein, the system 700 includes one or more processors 705, non-transitory computer readable program memory 702 which stores program instructions which, when executed by the processor(s) 705, implements an image analysis engine 710 which processes an input image 701, calculates various metrics related to the suitability of the image to embroidery, and determines whether or not the image is suitable to embroidery based on the calculated metrics of the image.

In an embodiment, the image analysis engine 710 calculates values for metrics including the gradient match (i.e., how similar the reduced-color gradient image is to the original gradient image), the degree of irregularity of the edges in the gradient image, and the estimated number of stitches. To this end, the image analysis engine includes a gradient match function 720, a linear edge irregularity function 730, a non-linear edge irregularity function 730, and a stitch number estimation function 740. Other embodiments may include any combination or subset of these metrics, and additionally may calculate alternative metrics that indicate the suitability of an image to an embroidery design.

The image analysis engine 710 also includes a metric analysis function 760, which receives each of the calculated metrics from functions 720, 730, 740, and/or 750, and, based on the values of the calculated metrics, determines whether or not the image 701 is suitable to embroidery. In an embodiment, the metric analysis function 760 provides an indicator which indicates pass or fail. A pass value indicates the image 701 is suitable to embroidery and a fail value indicates the image 701 is unsuitable for embroidery.

Figure 8:
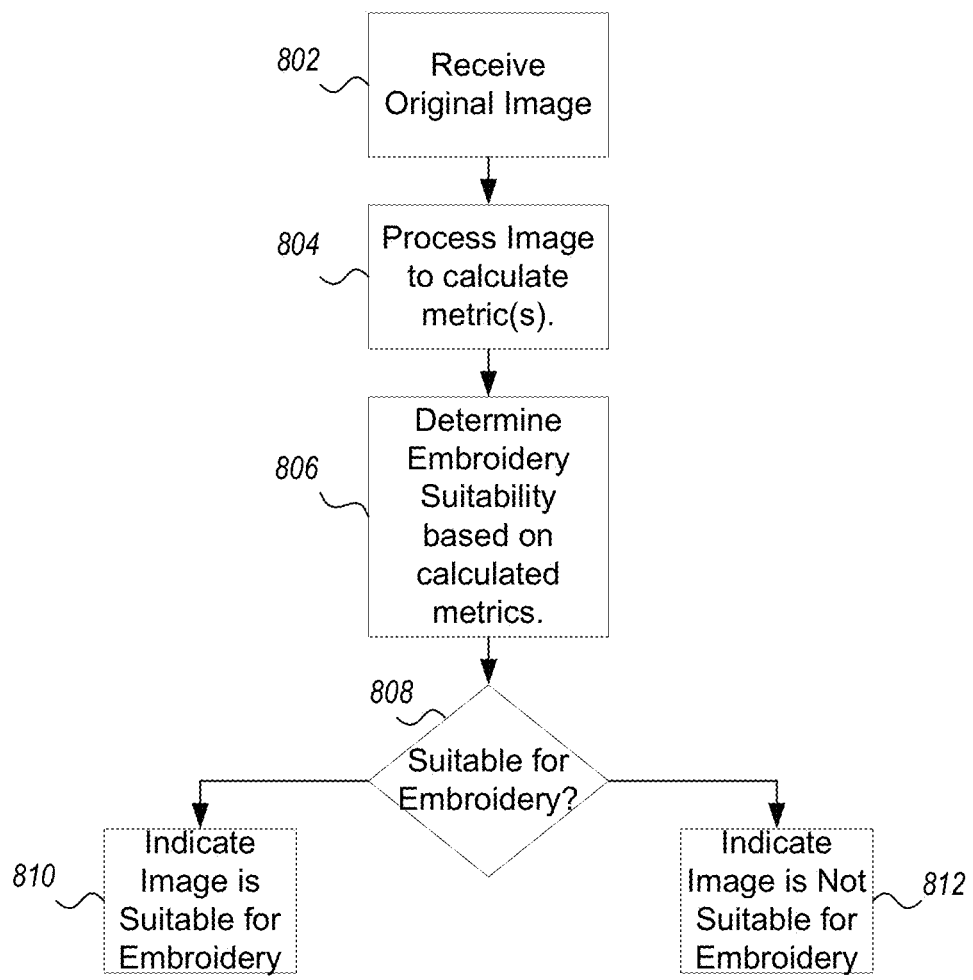
FIG. 8 is a flowchart illustrating an exemplary method for determining embroidery suitability of an image.

FIG. 8 shows a flowchart of an exemplary method performed by an embodiment of an image analysis engine 710 for detecting suitability of an image to embroidery. As illustrated, the image analysis engine receives an image (step 802). The image analysis engine processes the image to calculate one or more metrics (step 804). Based on the calculated metric values, the image analysis engine determines the suitability of the image for embroidery (step 806). The image analysis engine indicates whether the image is suitable for embroidery (steps 808, 810, 812).

Figure 9:
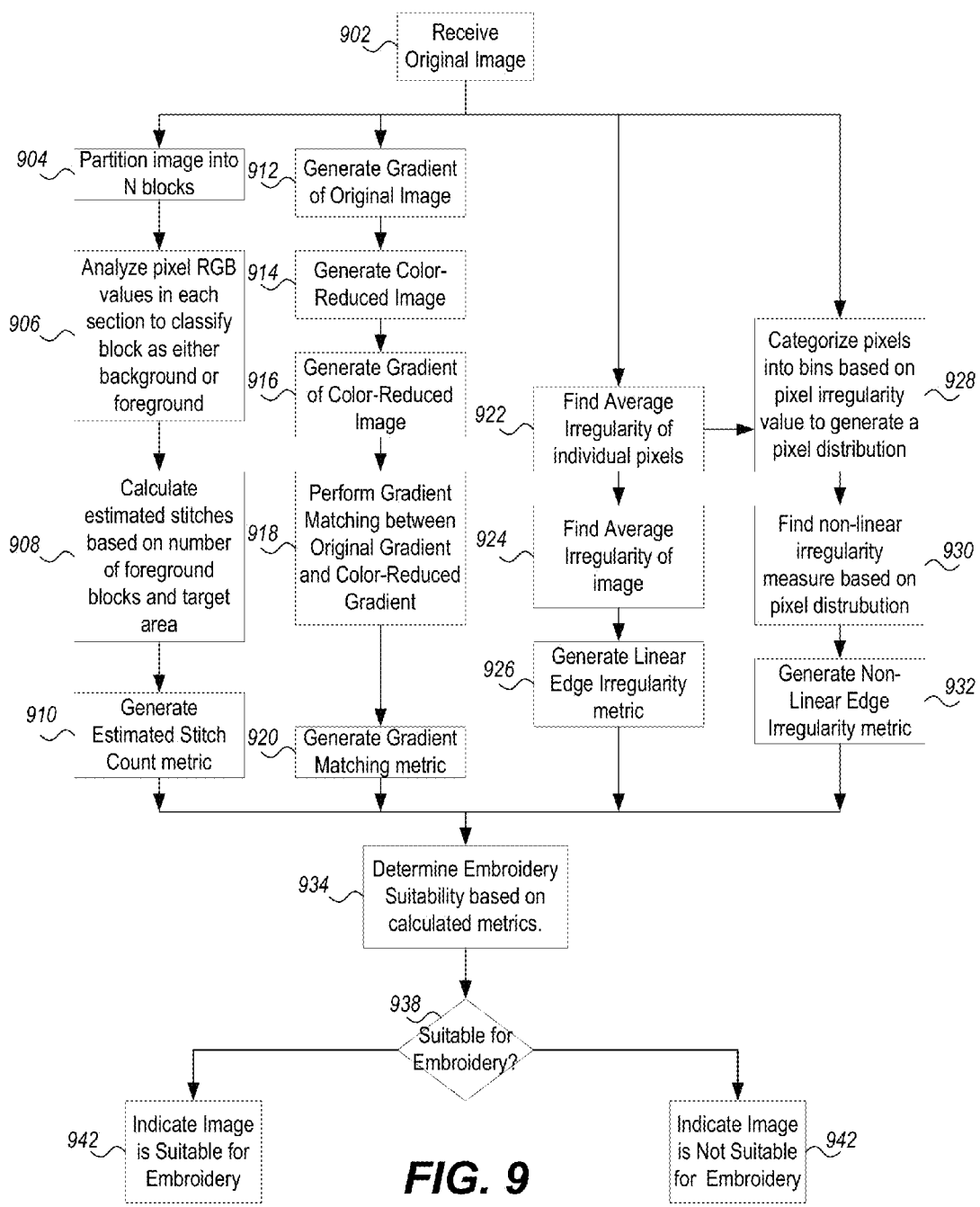
FIG. 9 is a further comprising illustrating an exemplary method for determining embroidery suitability of an image.

FIG. 9 depicts a flowchart of an exemplary method for detecting suitability of an image to embroidery. In this embodiment, upon receipt of an image to analyze (step 902), various image metrics are calculated, including one or more of an estimated stitch number metric (steps 904 through 910), a gradient match (steps 912 through 920), a linear edge irregularity metric (steps 922 through 926), and a non-linear edge irregularity metric (steps 928 through 923). Based on the calculated metrics, the method determines the suitability of the received image to embroidery (step 934). If the image is suitable to embroidery (step 936), then an indication that the image is suitable to embroidery is generated (step 938), otherwise an indication that the image is not suitable to embroidery is generated (step 940).

To generate the estimated stitch count metric, the image is partitioned into a set of N blocks (step 904). The RGB values of the pixels in each block are analyzed to determine whether the block contains mainly background image or whether it contains mainly foreground image, and each block is classified as either background or foreground accordingly (step 906). Based on the number of blocks classified as foreground blocks, the size of the target area, the size of the blocks when mapped into corresponding areas of the target area, and the estimated number of stitches per block, the method calculates an estimated number of stitches required for stitching an embroidery design generated from the image onto the target area of a product (e.g., a textile product such as a shirt or hat) (step 908). The method described above in relation to FIG. 5 is an exemplary method for performing this calculation. An estimated stitch count metric is then generated (step 910). The estimated stitch count metric can be a value of the estimated number of stitches. Alternatively, the estimated stitch count metric may be represented using other units of measure. For example, the estimated stitch count metric may instead be represented as the amount of time required to stitch the proposed design.

The gradient match metric indicates how well the gradient of the original image matches the gradient of the reduced-color image. To calculate the gradient matching metric, the original image is reduced (step 914), and a gradient image corresponding to each of the original image and the color-reduced image is generated (i.e., an original gradient image (step 912) and a reduced-color gradient image (step 914)). Gradient matching is performed by comparing the gradients of the original image and the color-reduced image (step 918). In an embodiment, each pixel in the original gradient image is compared to its corresponding pixel in the reduced-color gradient image, keeping track of the number of pixels that have differing values. The gradient match is the number of matching pixels over the total number of pixels. Thus, if too many new edges appear in the color-reduced image that were not present in the original image, or if too many edges that were present in the original image do not appear in the color-reduced image, the gradient match will be lower. A Gradient Matching metric is generated (step 920). In an embodiment, the Gradient Matching metric reflects how closely the gradients of the original image and the color-reduced image match, normalized to range from between 0 (no match) to 1 (full match).

A measure of the level of edge irregularity of the image may be performed using either or both of a linear or nonlinear calculation. In an embodiment, the linear edge irregularity metric is found by finding the average irregularity of each pixel having at least a minimum threshold amount of gradient activity (step 922) and then finding the average irregularity of the image by calculating the average of the individual pixel averages for those pixels exhibiting the minimum threshold amount of gradient activity (step 924). This result can then be normalized to range from between 0 (no irregularities) to 1 (highest irregularities) to generate a linear edge irregularity metric (step 926).

In an embodiment, the nonlinear edge irregularity metric is generated by finding the average irregularity of each pixel having at least a minimum threshold amount of gradient activity (step 922) and then categorizing the pixels based on the individual pixel irregularity value to generate a pixel distribution. In an embodiment, the non-linear irregularity measure is calculated (step 930) according to the equation for $IMAGE_{IRR\_nonlinear}$ as defined above. This result can then be normalized to range from between 0 (no irregularities) to 1 (highest irregularities) to generate a non-linear edge irregularity metric (step 932).

In an embodiment, all of the metrics (estimated stitch count, gradient match, linear edge irregularity, non-linear edge irregularity) are calculated and an image must meet predefined criteria to be considered suitable for embroidery. For example, for a given embroidery environment, it may be decided that only images that convert to a design with at most a predetermined number of stitches, and which generates at least a 95% gradient match, and at most a 5% nonlinear irregularity and at most a 1.5% nonlinear irregularity. The thresholds for each metric can be made adjustable.

Additionally, some applications of the embroidery suitability detection system may not require all metrics to be calculated. For example, some users of the system may not care how many stitches or how much time is required to embroider the design and as a result the estimated stitches count metric is not calculated. Conversely, other users of the embroidery suitability detection system may only care about how many stitches or how long it will take to embroider the design and thus may only determine the suitability of the image to embroidery based on the estimate stitch count metric. In other applications, some users may not require both a linear and a non-linear edge irregularity metric and may calculate only one of these metrics. In general, embroidery suitability may be determined for a particular application based on one or more of the calculated metrics, each of which represents a different aspect of what make an image suitable for embroidery. However, for best visual results of an embroidered design, it is best to calculate at least one metric per desired aspect (e.g., gradient match, edge irregularity, stitch count/time required to stitch).

Those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

What is claimed is:

1. A method for determining the suitability of an original image to embroidery, the method comprising the steps of:
   reducing the image to a predetermined number of colors to generate a reduced image;
   calculating a gradient match between the original image and the reduced image;
   calculating an irregularity metric indicative of a level of edge irregularities of the reduced image; and
   determining whether or not the original image is suited to embroidery based on at least the gradient match and the irregularity metric.

2. The method of claim 1, wherein the determining step comprises:
   comparing the gradient match to a predetermined gradient match threshold;
   comparing the irregularity metric to a predetermined irregularity metric threshold; and
   determining that the original image is suited to embroidery if the gradient match is above the gradient match threshold and the irregularity metric is below the irregularity metric threshold, and
   determining that the original image is not suited to embroidery if the gradient match is below the gradient match threshold or the irregularity metric is above the irregularity metric threshold.

3. The method of claim 1, further comprising:
   calculating an estimated stitch count metric of the reduced image; and
   determining whether or not the original image is suited to embroidery based on the gradient match, the irregularity metric, and the estimated stitch count metric.

4. The method of claim 1, further comprising:
   calculating an irregularity distribution metric of the reduced image, the irregularity distribution metric indicative of a distribution of number of pixels in the reduced image with respect to edge irregularity; and
   determining whether or not the original image is suited to embroidery based on the gradient match, the irregularity metric, and the irregularity distribution metric.

5. The method of claim 4, wherein the step of determining whether or not the original image is suited to embroidery comprises:
   comparing the gradient match to a predetermined gradient match threshold;
   comparing the irregularity metric to a predetermined irregularity metric threshold;
   comparing the irregularity distribution metric to a predetermined irregularity distribution metric threshold; and
   determining that the original image is suited to embroidery if the gradient match is above the gradient match threshold and the irregularity metric is below the irregularity metric threshold and the irregularity distribution metric is below the irregularity distribution metric threshold, and
   determining that the original image is not suited to embroidery if the gradient match is below the gradient match threshold or the irregularity metric is above the irregularity metric threshold or the irregularity distribution metric is above the irregularity distribution metric threshold.

6. The method of claim 4, further comprising:
   calculating an estimated stitch count metric of the reduced image; and
   determining whether or not the original image is suited to embroidery based on the gradient match, the irregularity metric, the irregularity distribution metric, and the estimated stitch count metric.

7. Non-transitory computer readable storage tangibly embodying program instructions which, when executed by a computer, implement a method for determining the suitability of an original image to embroidery, the method comprising the steps of:
   reducing the image to a predetermined number of colors to generate a reduced image;
   calculating a gradient match between the original image and the reduced image;
   calculating an irregularity metric indicative of a level of edge irregularities of the reduced image; and
   determining whether or not the original image is suited to embroidery based on the gradient match and the irregularity metric.

8. The non-transitory computer readable storage of claim 7, wherein the determining step comprises:
   comparing the gradient match to a predetermined gradient match threshold;
   comparing the irregularity metric to a predetermined irregularity metric threshold; and
   determining that the original image is suited to embroidery if the gradient match is above the gradient match threshold and the irregularity metric is below the irregularity metric threshold, and
   determining that the original image is not suited to embroidery if the gradient match is below the gradient match threshold or the irregularity metric is above the irregularity metric threshold.

9. The non-transitory computer readable storage of claim 7, the method further comprising:
   calculating an irregularity distribution metric of the reduced image, the irregularity distribution metric indicative of a distribution of number of pixels in the reduced image with respect to edge irregularity; and determining whether or not the original image is suited to embroidery based on the gradient match, the irregularity metric, and the irregularity distribution metric.

10. The non-transitory computer readable storage of claim 9, wherein the determining step comprises:
comparing the gradient match to a predetermined gradient match threshold;
comparing the irregularity metric to a predetermined irregularity metric threshold;
comparing the irregularity distribution metric to a predetermined irregularity distribution metric threshold; and
determining that the original image is suited to embroidery if the gradient match is above the gradient match threshold and the irregularity metric is below the irregularity metric threshold and the irregularity distribution metric is below the irregularity distribution metric threshold, and
determining that the original image is not suited to embroidery if the gradient match is below the gradient match threshold or the irregularity metric is above the irregularity metric threshold or the irregularity distribution metric is above the irregularity distribution metric threshold.

11. The non-transitory computer readable storage of claim 9, the method further comprising:
calculating an estimated stitch count metric of the reduced image; and
determining whether or not the original image is suited to embroidery based on the gradient match, the irregularity metric, the irregularity distribution metric, and the estimated stitch count metric.

12. The non-transitory computer readable storage of claim 7, the method further comprising:
calculating an estimated stitch count metric of the reduced image; and
determining whether or not the original image is suited to embroidery based on the gradient match, the irregularity metric, and the estimated stitch count metric.

13. An apparatus for determining the suitability of an original image to embroidery, comprising:
computer readable memory storing the original image;
one or more processors configured to reduce the image to a predetermined number of colors to generate a reduced image, calculate a gradient match between the original image and the reduced image, calculate an irregularity metric indicative of a level of edge irregularities of the reduced image, and determine whether or not the original image is suited to embroidery based on at least the gradient match and the irregularity metric.

14. The apparatus of claim 13, wherein the one or more processors are further configured to:
compare the gradient match to a predetermined gradient match threshold;
compare the irregularity metric to a predetermined irregularity metric threshold; and
determine that the original image is suited to embroidery if the gradient match is above the gradient match threshold and the irregularity metric is below the irregularity metric threshold, and
determine that the original image is not suited to embroidery if the gradient match is below the gradient match threshold or the irregularity metric is above the irregularity metric threshold.

15. The apparatus of claim 13, wherein the one or more processors are further configured to:
calculate an estimated stitch count metric of the reduced image; and
determine whether or not the original image is suited to embroidery based on the gradient match, the irregularity metric, and the estimated stitch count metric.

16. The apparatus of claim 13, wherein the one or more processors are further configured to:
calculate an irregularity distribution metric of the reduced image, the irregularity distribution metric indicative of a distribution of number of pixels in the reduced image with respect to edge irregularity; and
determine whether or not the original image is suited to embroidery based on the gradient match, the irregularity metric, and the irregularity distribution metric.

17. The apparatus of claim 16, wherein the one or more processors are further configured to:
compare the gradient match to a predetermined gradient match threshold;
compare the irregularity metric to a predetermined irregularity metric threshold;
compare the irregularity distribution metric to a predetermined irregularity distribution metric threshold; and
determine that the original image is suited to embroidery if the gradient match is above the gradient match threshold and the irregularity metric is below the irregularity metric threshold and the irregularity distribution metric is below the irregularity distribution metric threshold, and
determine that the original image is not suited to embroidery if the gradient match is below the gradient match threshold or the irregularity metric is above the irregularity metric threshold or the irregularity distribution metric is above the irregularity distribution metric threshold.

18. The apparatus of claim 16, wherein the one or more processors are further configured to:
calculate an estimated stitch count metric of the reduced image; and
determine whether or not the original image is suited to embroidery based on the gradient match, the irregularity metric, the irregularity distribution metric, and the estimated stitch count metric.

19. A method for determining the suitability of an image to embroidery, the method comprising the steps of:
one or more processors processing the image to calculate one or more metrics indicative of the suitability of the image for conversion to embroidery, the one or more metrics comprising at least one metric of the group of metrics consisting of: a gradient match metric representing a gradient match between the image and a reduced image which comprises the image reduced to a predetermined number of colors, an irregularity metric indicative of a level of edge irregularities of the reduced image, an irregularity distribution metric indicative of a frequency of irregularities of the reduced image, and an estimated stitch count metric representing an estimated number of stitches required to embroider an embroidery design based on the image;
performing an analysis of the calculated one or more metrics to determine whether the image is suitable for embroidery;
indicating by the one or more processors whether the image is suitable for embroidery based on the analysis.

20. The method of claim 19, wherein the image comprises a digital image represented by a 2-dimensional grid of pixels.

21. The method of claim 19, wherein the irregularity distribution metric is indicative of a distribution of number of pixels in the reduced image with respect to edge irregularity.

22. Non-transitory computer readable storage tangibly embodying program instructions which, when executed by a computer, implement a method for determining the suitability of an image to embroidery, the method comprising the steps of:

one or more processors processing the image to calculate one or more metrics indicative of the suitability of the image for conversion to embroidery, the one or more metrics comprising at least one metric of the group of metrics consisting of: a gradient match metric representing a gradient match between the image and a reduced image which comprises the image reduced to a predetermined number of colors, an irregularity metric indicative of a level of edge irregularities of the reduced image, an irregularity distribution metric indicative of a frequency of irregularities of the reduced image, and an estimated stitch count metric representing an estimated number of stitches required to embroider an embroidery design based on the image;

performing an analysis of the calculated one or more metrics to determine whether the image is suitable for embroidery;

indicating by the one or more processors whether the image is suitable for embroidery based on the analysis.

23. The non-transitory computer readable storage of claim 22, wherein the image comprises a digital image represented by a 2-dimensional grid of pixels.

24. The non-transitory computer readable storage of claim 22, wherein the irregularity distribution metric is indicative of a distribution of number of pixels in the reduced image with respect to edge irregularity.

25. An apparatus for determining the suitability of an image to embroidery, comprising:

computer readable memory storing the image;

one or more processors configured to process the image to calculate one or more metrics indicative of the suitability of the image for conversion to embroidery, the one or more metrics comprising at least one metric of the group of metrics consisting of: a gradient match metric representing a gradient match between the image and a reduced image which comprises the image reduced to a predetermined number of colors, an irregularity metric indicative of a level of edge irregularities of the reduced image, an irregularity distribution metric indicative of a frequency of irregularities of the reduced image, and an estimated stitch count metric representing an estimated number of stitches required to embroider an embroidery design based on the image; the one or more processors further configured to analyze the calculated one or more metrics to determine whether the image is suitable for embroidery, and provide an indication as to whether the image is suitable for embroidery based on the analysis.

26. The apparatus of claim 25, wherein the image comprises a digital image represented by a 2-dimensional grid of pixels.

27. The apparatus of claim 25, wherein the irregularity distribution metric is indicative of a distribution of number of pixels in the reduced image with respect to edge irregularity.

* * * * *